United States Patent [19]
Bartis et al.

[11] Patent Number: 5,311,512
[45] Date of Patent: May 10, 1994

[54] MULTIPLE-MASTER DIGITAL COMMUNICATION TECHNIQUE UTILIZING A DEDICATED CONTENTION BUS

[75] Inventors: Robert M. Bartis, Neptune; Charles W. K. Gritton, North Brunswick; Ying T. Tao, Manalapan, all of N.J.

[73] Assignee: AT&T Bell Laboratories, Murray Hill, N.J.

[21] Appl. No.: 989,676

[22] Filed: Dec. 14, 1992

[51] Int. Cl.⁵ .................................. H04J 3/02
[52] U.S. Cl. ........................ 370/85.2; 370/85.11; 340/825.5
[58] Field of Search ............... 370/85.1-85.3, 370/85.6, 85.9, 85.11, 94.1; 340/825.50, 825.51; 375/36

[56] References Cited

U.S. PATENT DOCUMENTS

| | | | |
|---|---|---|---|
| 4,063,220 | 12/1977 | Metcalfe et al. | 370/85.2 |
| 4,210,780 | 7/1980 | Hopkins et al. | 370/85.2 |
| 4,598,285 | 7/1986 | Hoshen | 370/85.2 |
| 4,626,843 | 12/1986 | Szeto et al. | 370/85.2 |
| 4,635,030 | 1/1987 | Rauch | 340/825.5 |
| 4,654,655 | 3/1987 | Kowalski | 340/825.5 |
| 4,669,079 | 5/1987 | Blum | 340/825.5 |
| 4,740,956 | 4/1988 | Hailpern et al. | 370/85.2 |
| 4,852,091 | 7/1989 | Li | 370/85.21 |
| 5,065,153 | 11/1991 | Tomita et al. | 370/58.2 |

OTHER PUBLICATIONS

Davies et al., Computer Network and their Protocols, 1979 pp. 165-188.

Primary Examiner—Douglas W. Olms
Assistant Examiner—Chau T. Nguyen
Attorney, Agent, or Firm—Robert P. Marley

[57] ABSTRACT

A multiple-master, digital communication technique is provided which employs standard universal asynchronous receivers and transmitters ("UARTs") linked to a common data transmission bus, and a hardware-based inter-station contention scheme utilizing a bus separate from that employed for data transmission. This communication technique effectively eliminates any window of collision for data transmitted on the bus, and greatly reduces the amount of software processing required to resolve contention between stations. In addition, the hardware required to support the dedicated contention bus scheme is comprised of inexpensive, commercially available logic gates.

12 Claims, 3 Drawing Sheets

MULTIPLE-MASTER DIGITAL COMMUNICATION TECHNIQUE UTILIZING A DEDICATED CONTENTION BUS

TECHNICAL FIELD

The invention relates to digital transmission systems and, more particularly, to the transmission of digital information within a multiple-master communication system.

BACKGROUND OF THE INVENTION

Within multiple-master, digital communication systems any station linked to the system may transmit data over a common communication bus at anytime. Invariably, within such systems, a monitoring and control arrangement must be provided to detect simultaneous data transmissions by multiple stations over the common communication bus, and terminate the colliding transmissions until the common bus is clear. While numerous data collision avoidance and detection arrangements exist for multiple-master, digital communication systems, typically they all include a listen-while-talking ("LWT") collision detection/avoidance scheme.

In a system employing an LWT scheme, each station monitors the common communication bus prior to transmitting, and if another transmission is determined to be already in progress, each monitoring station defers its transmission. Upon detecting that all other transmissions have ceased, and the common bus is clear, the station would then begin its own transmission while continuing to monitor the common bus (listening while talking). Unfortunately, one or more other stations which also deferred transmissions, and could begin transmitting at the moment the common bus clears. This would result in data collisions, which would be detected by all the transmitting stations (since each continues to monitor the common channel during transmission). Upon collision detection, each of the stations involved terminates transmission (referred to as "backing off") and enters into a contention to gain control of the bus. This contention is performed via digital processing according to a prescribed algorithm tailored to the particular multiple-master, digital communication system.

Another drawback of an LWT collision detection scheme is a window of collision which exists with respect to inter-station communications. A signal transmitted on a common bus by one station will not reach other stations linked to that bus for a finite interval (the transmission time between stations). One of the other stations linked to the common bus may erroneously commence transmitting a second signal on the bus during this interval as the bus would appear to be clear. This second signal would of course collide with the first signal. The actual window of collision for a given system is an interval of time equal to the maximum transmission time between stations within the system, plus the processing time required for any given station to recognize that the bus is clear and that it is the apparent winner of the contention for control of the bus. Since station contention within existing multimaster systems is performed via processing of complex software algorithms, the duration of the actual window of collision is usually many times greater than the maximum transmission time within the systems.

SUMMARY OF THE INVENTION

In accordance with the principles of the invention, a multiple-master, digital communication technique is provided which employs standard universal asynchronous receivers and transmitters ("UARTs") linked to a common data transmission bus, and a hardware-based inter-station contention scheme utilizing a bus separate from that employed for data transmission. This communication technique effectively eliminates any window of collision for data transmitted on the bus, and greatly reduces the amount of software processing required to resolve contention between stations. In addition, the hardware required to support the dedicated contention bus scheme is comprised of inexpensive, commercially available logic gates.

DETAILED DESCRIPTION

Figure 1:
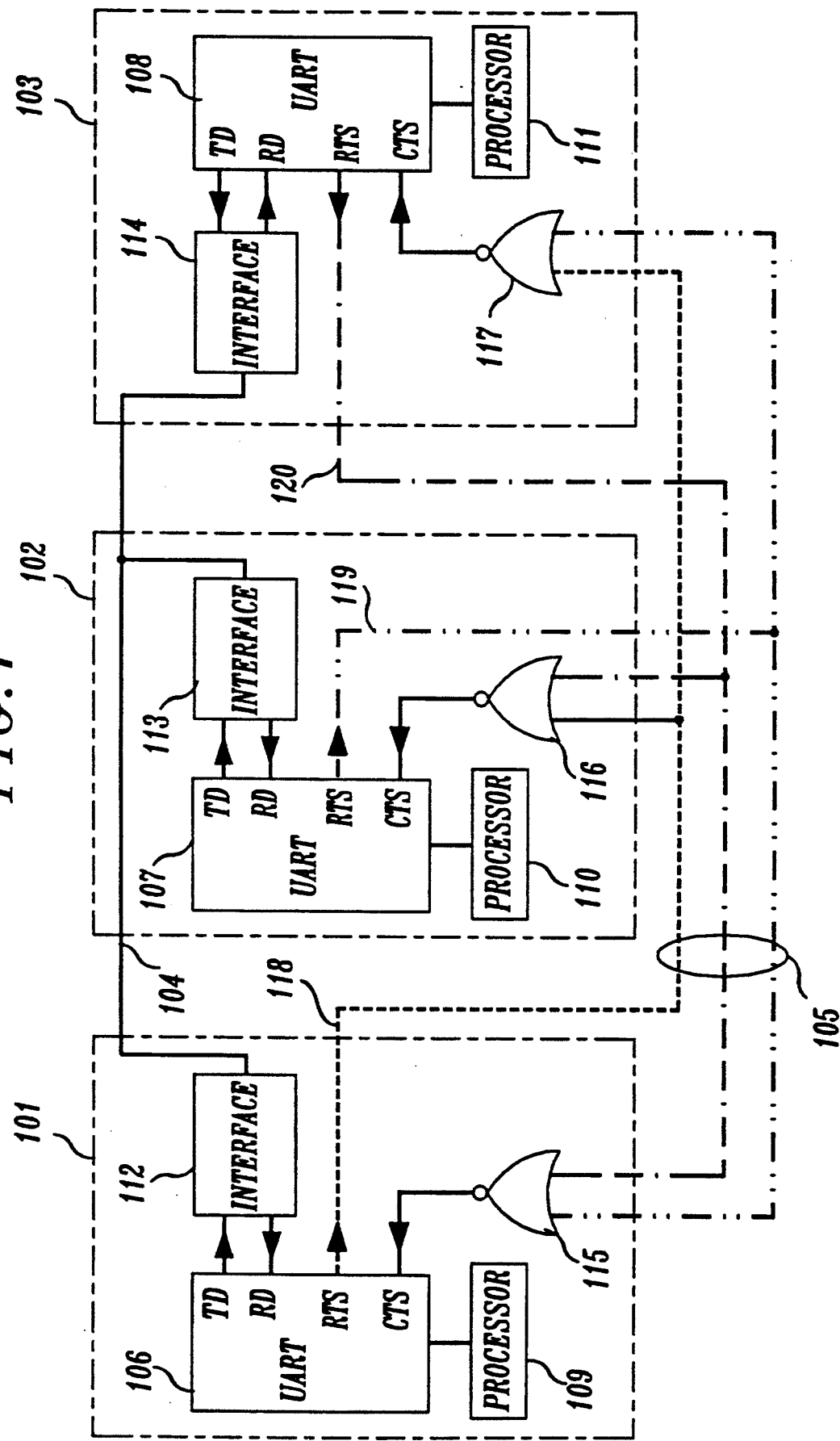
FIG. 1 shows, in simplified block diagram form, a multiple-master digital communication system incorporating a particular embodiment of invention.

FIG. 1 shows, in simplified form, a multiple-master digital communication system incorporating a particular embodiment of the invention. As shown, three stations (101, 102, and 103), common bidirectional communication bus 104, and contention bus 105 are included in the system. Each of the stations within the system contains a UART (106, 107, and 108), a processor (109, 110, and 111), a bidirectional interface (112, 113, and 114), and a NOR-gate (115, 116, and 117). The UARTs illustrated are configured to transmit data out of a Transmission Data ("TD") port, and receive data via a Receive Data ("RD") port. Each UART conforms to a common data protocol wherein data transmission may only take place after a Request To Send ("RTS") port is asserted (i.e., brought to a logical value of "1"), and the signal evident at a Clear To Send ("CTS") port is confined to be a logical "1". Bidirectional interfaces 112, 113, and 114 each provide an interface between communication bus 104 and the TD and RD ports of the UARTS.

As shown, contention bus 105 includes three independent contention channels, 118, 119, and 120. Each of these contention channels is dedicated to carrying the RTS signal output by a particular UART. Contention channel 118 carries the RTS signal of UART 106, contention channel 119 carries the RTS signal of UART 107, and contention channel 120 carries the RTS signal of UART 108.

In practicing the invention, each station contends for control of communication bus 104 prior to transmitting any data from a UART TD port. All such contention is performed exclusively via the contention channels within contention bus 105. For example, if data were to be transmitted from station 101 via UART 106, processor 109 would obtain the status of the CTS port of UART 106, and if that port were found to be at a logical "1", processor 109 would set the RTS port of UART 106, and thereby contention channel 118, to a logical "1" value. This places the outputs of NOR-gates 116 and 117 in a logical "0" state, and ensures that the CTS ports of UARTs 107 and 108 remain at logical "0". In this state, the initiation of data transmissions over communication bus 104 by stations 102 and 103 would be prohibited. After a fixed period $T_{Delay}$, processor 109 interrogates the CTS port of UART 106 again. Only if that port is found to still be at a logical "1" is data transmitted from the TD port of UART 106. The presence of a logical "1" at the CTS port of UART 106 signifies that communication bus 104 is idle (i.e., both stations 102 and 103 are not presently transmitting, or requesting to transmit data). The period $T_{Delay}$ is chosen to be equal to the maximum RTS signal transmission time between stations, plus the time required by a processor to interrogate a UART CTS port and set a UART RTS port to a logical "1" state. The data output by UART 106 is propagated along communication channel 104 via bidirectional interface 112. For the duration of any data transmission by UART 106, contention channel 118 is held in a logical "1" state, thereby maintaining the output of NOR-gates 116 and 117 in a logical "0" state.

The delay period, $T_{Delay}$, is imposed by processor 109 to insure that inadvertent data collisions do not occur. If such a delay were not imposed, and stations immediately transmitted data along communication bus 104 after determining that a UART CTS port was at logical "0", there would exist a limited window of collision within the system of FIG. 1. This window would be equal to the inter-station transit time of RTS signals along contention bus 105, plus the time required by a processor to interrogate CTS ports and set RTS ports.

The problem may be illustrated by examining the operation of a system similar to that of FIG. 1, but with a $T_{Delay}$ of zero. In initiating a data transmission, station 101 would interrogate the CTS of UART 106, and if that CTS port was found to be at a logical "1", assert the RTS port of UART 106 (i.e., set the RTS port to a logical "1"). Immediately thereafter station 101 would commence transmitting data on communication bus 104. In response, the CTS ports of UARTs 107 and 108 would change state from a logical "1" to a logical "0". Naturally, these CTS ports would not change state instantaneously when the RTS port of UART 106 was asserted. A propagation delay would be introduced as the signal from the RTS port of UART 106 traveled along contention channel 118 to the input of NOR-gates 116 and 117, and further delay introduced as a result of the response times of NOR-gates 11 6 and 117. The window of collision for the $T_{Delay}=0$ system would be the aggregate of these transit and response times. During this window, the CTS ports of the UARTs within stations 102 and 103 would be at a logical "1" state, erroneously indicating that communication bus 104 was idle (even though station 101 had already initiated a data transmission). As a result of this erroneous indication, both station 102 and station 103 could immediately initiate a data transmission—resulting in a data collision with the transmission from station 101. Within the invention, however, since the processors are programmed to interrogate a UART CTS port, pause for a period $T_{Delay}$, and then re-interrogate the UART CTS port, prior to initiating a transmission, any window of collision is eliminated.

Both stations 102 and 103 operate in manner similar to that of station 101, entering into contention for communication bus 104 prior to transmitting data. The CTS port of the UART within each station is linked to the output of a NOR-gate which monitors the state of the RTS ports of the other stations within the system. UART 107 of station 102 is linked to NOR-gate 116 (which monitors stations 101 and 103), and UART 108 of station 103 is linked to NOR-gate 117 (which monitors stations 101 and 102).

Figure 2:
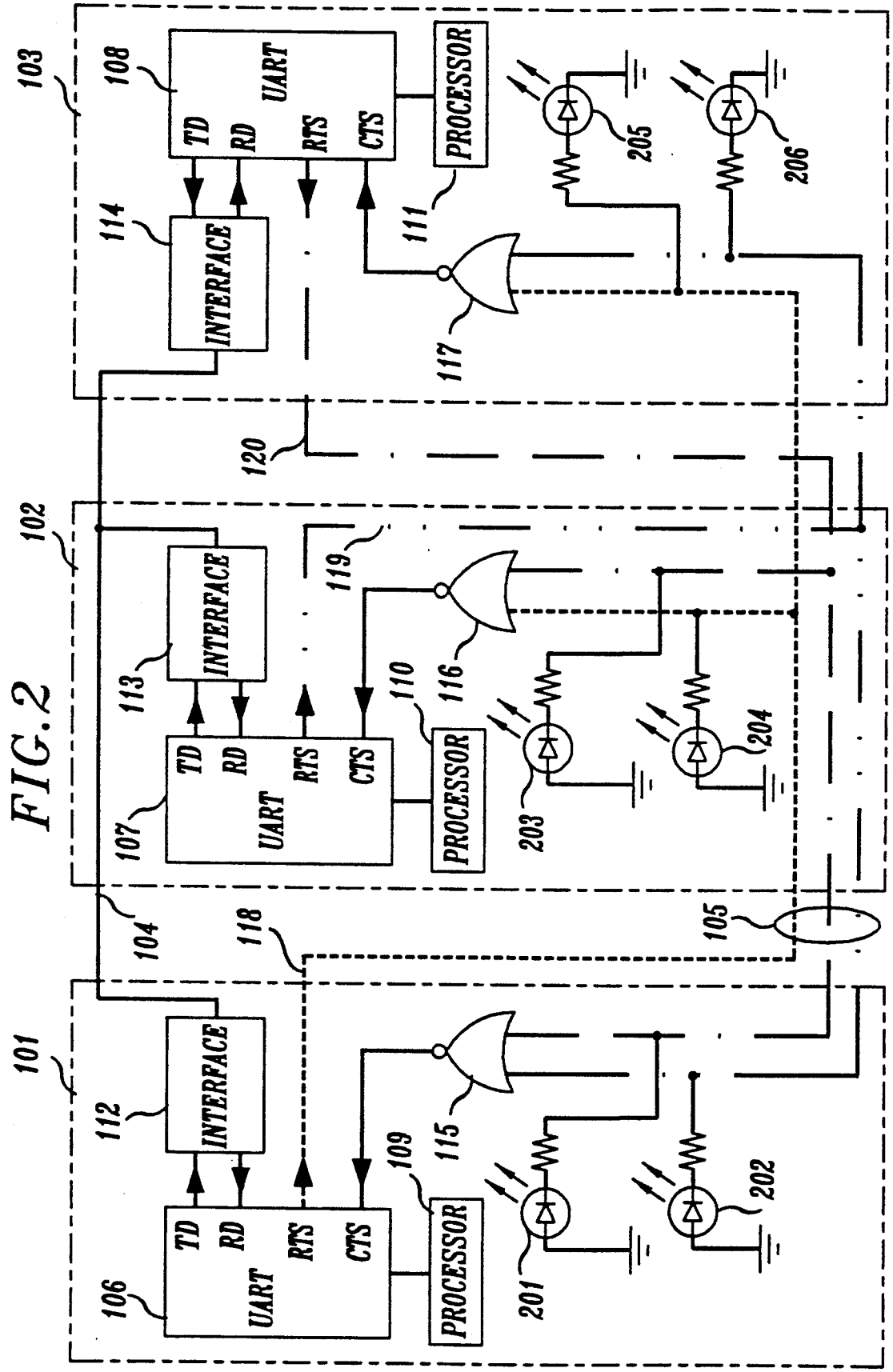
FIG. 2 shows, in simplified block diagram form, a multiple-master digital communication system incorporating a second embodiment of the invention.

Another embodiment the invention is included within the digital communication system illustrated in FIG. 2. The configuration and operation of this system is similar to that of the system of FIG. 1, however an LED is coupled to each of the input leads of the NOR-gates within each station. These LEDs (labeled 201-206) provide a visual indication as to the particular station which is currently transmitting data, or requesting to transmit data, upon communication bus 104. For example, LEDs 203 and 205 (within stations 102 and 103, respectively) illuminate when contention channel 118 is asserted by UART 106 of station 101. Informing an individual at station 102 or 103 that station 101 was contending for control of communication bus 104.

The application of this invention to digital communication systems need not be limited to three station arrangements. Any of the above described systems could be expanded to accommodate any number of stations. A contention channel would have to be provided for each station, and a NOR-gate capable of accepting (n−1) input signals provided for each station (where n is the total number of stations in the system).

Figure 3:
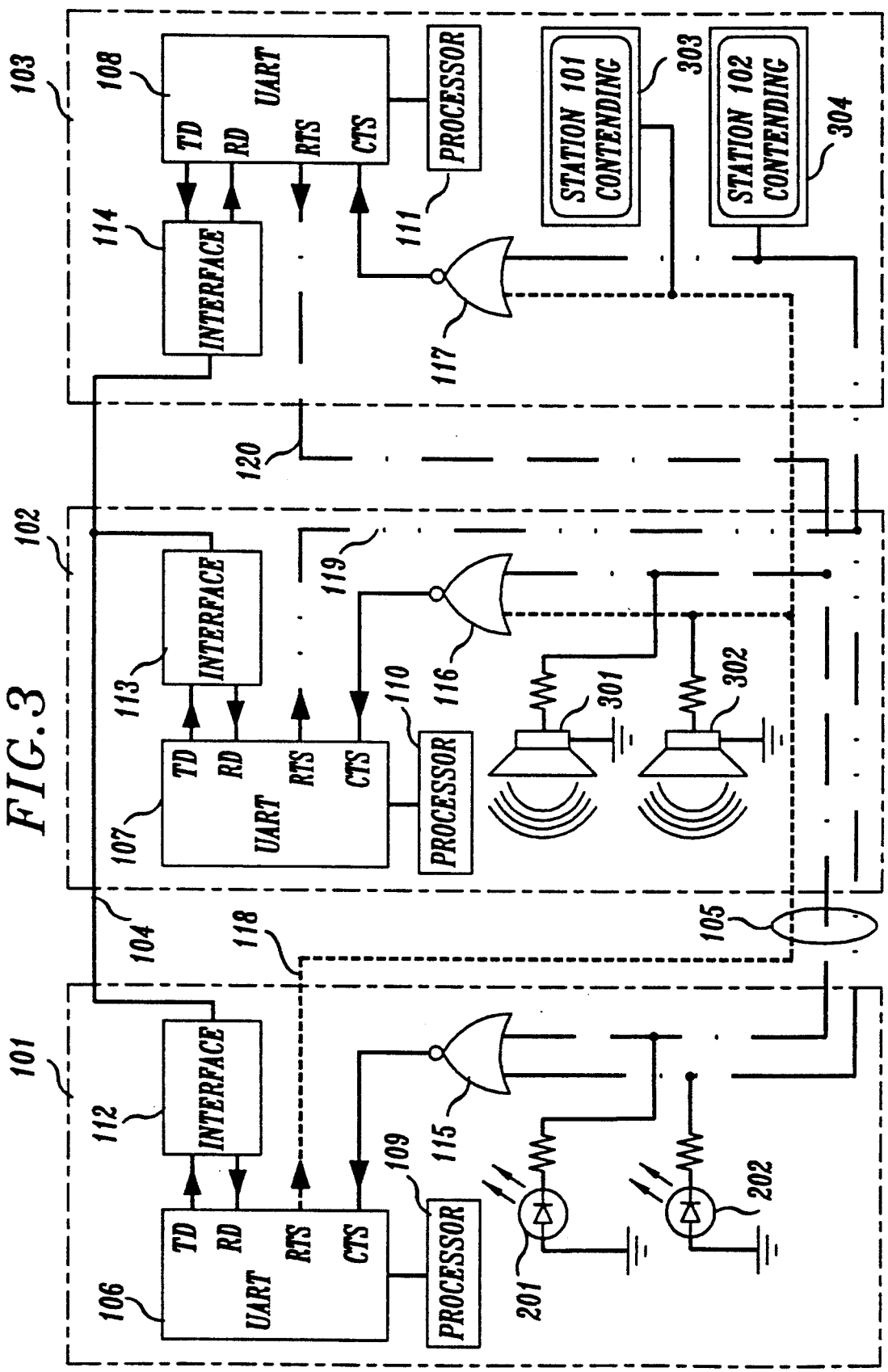
FIG. 3 shows, in simplified block diagram form, a multiple-master digital communication system incorporating a third embodiment of the invention.

It will be understood that the particular techniques described are only illustrative of the principles of the present invention, and that various modifications could be made by those skilled in the art without departing from the scope and spirit of the present invention, which is limited only by the claims that follow. One such modification might include practicing the invention within a system having n stations and m contention channels; where $1<m<n$. At least one of the m contention channels would be shared by one or more stations. Another modification of invention might include alternate signaling devices devices, such as tone generators (301, 302) or alphanumeric displays (303, 304) coupled to the inputs of a NOR-gate and/or inverter within a given station to provide an indication of contention bus status (see FIG. 3).

We claim:

1. A digital communication system comprising:
a communication channel;
a contention bus comprised of a plurality of contention channels, each of said contention channels capable of being placed in either an idle state or a busy state;
a plurality of asynchronous stations, each of said asynchronous stations paired with one of said contention channels, and adapted to transmit data via said communication channel;
a plurality of contention means, each associated with one of said plurality of asynchronous stations and coupled to the contention channel paired with said associated asynchronous station, each of said contention means adapted to place said coupled contention channel in a busy state during the initiation and performance of a data transmission via said communication channel by said associated asynchronous station, and each contention means further adapted to monitor the state of the contention channels coupled to all other contention means, and permit said associated asynchronous station to initiate a data transmission via said communication channel only after all of said monitored contention channels are found to be in an idle state after a fixed period has elapsed from the time at which said contention channel coupled to said associated asynchronous station was placed in a busy state.

2. The digital communication system of claim 1 wherein said fixed period has a duration greater than or equal to the sum of the maximum inter-station transmission time for a signal transmitted upon said contention bus, and the time required for each of said contention means to place said coupled contention channel in a busy state at the initiation of a data transmission.

3. The digital communication system of claim 1 wherein each contention means further comprises a means for indicating which of said plurality of asynchronous stations is initiating or performing a data transmission via said communication channel.

4. The digital communication system of claim 3 wherein said means for indicating includes a light emitting diode.

5. The digital communication system of claim 3 wherein said means for indicating includes an audible signal generator.

6. The digital communication system of claim 3 wherein said means for indicating includes an alphanumeric display.

7. A method of effecting from one of said plurality of asynchronous stations a data transmission via said communication channel, in a digital communication system comprising:
- a communication channel;
- a contention bus comprised of a plurality of contention channels, each of said contention channels capable of being placed in either an idle state or a busy state;
- a plurality of asynchronous stations, each of said asynchronous stations paired with one of said contention channels, and adapted to transmit data via said communication channel;
- a plurality of contention means, each associated with one of said plurality of asynchronous stations and coupled to the contention channel paired with said associated asynchronous station, each of said contention means adapted to place said coupled contention channel in either a busy state or an idle state;

comprising the steps of:
- placing the contention channel paired with said one asynchronous station into a busy state;
- monitoring the state of the contention channels associated with all other asynchronous stations to determine if any of said monitored contention channels are in a busy state;
- permitting said one asynchronous station to initiate a data transmission only if all of said monitored contention channels are determined to be in an idle state at the end of a fixed period from the time at which said contention channel coupled to said associated asynchronous station was placed in a busy state.

8. The method of claim 7 wherein said fixed period has a duration greater than or equal to the sum of the maximum inter-station transmission time for a signal transmitted upon said contention bus, and the time required for each of said contention means to place said coupled contention channel in a busy state at the initiation of a data transmission.

9. The method of claim 7 further comprising the step of providing an indication as to which of said plurality of asynchronous stations is currently initiating or performing a data transmission via said communication channel.

10. The method of claim 9 wherein a light emitting diode is illuminated as an indication of which said plurality of asynchronous stations is currently initiating or performing a data transmission via said communication channel.

11. The method of claim 9 wherein an audible signal is sounded as an indication of which of said plurality of asynchronous stations is currently initiating or performing a data transmission via said communication channel.

12. The method of claim 9 wherein an indication of which of said plurality of asynchronous stations is currently initiating or performing a data transmission via said communication channel is displayed upon an alphanumeric display.

* * * * *